United States Patent [19]

Yoshitoshi et al.

[11] Patent Number: 4,731,777
[45] Date of Patent: Mar. 15, 1988

[54] OPTICAL DISK PLAYER

[75] Inventors: You Yoshitoshi; Tsutomu Toyoguchi, both of Tokyo; Ryoji Takamatsu; Yoshiro Watanabe, both of Kanagawa, all of Japan

[73] Assignee: Sony Corporation, Tokyo, Japan

[21] Appl. No.: 879,129

[22] PCT Filed: Oct. 9, 1985

[86] PCT No.: PCT/JP85/00557
§ 371 Date: Jun. 19, 1986
§ 102(e) Date: Jun. 19, 1986

[87] PCT Pub. No.: WO86/02482
PCT Pub. Date: Apr. 24, 1986

[30] Foreign Application Priority Data

Oct. 11, 1984 [JP] Japan .............. 59-153438[U]

[51] Int. Cl.$^4$ .............................. G11B 25/04
[52] U.S. Cl. .................... 369/263; 369/246; 369/248
[58] Field of Search ........... 369/246, 247, 248, 263, 369/264, 258

[56] References Cited

U.S. PATENT DOCUMENTS

| | | | |
|---|---|---|---|
| 3,263,953 | 8/1966 | Shottenfeld et al. | 369/263 |
| 3,510,137 | 5/1970 | Freier | 369/263 |
| 4,387,453 | 6/1983 | Zolt | 369/263 |
| 4,570,253 | 2/1986 | Fyebaugh | 369/246 |
| 4,633,973 | 1/1987 | Kitano | 369/248 |

FOREIGN PATENT DOCUMENTS

| | | | |
|---|---|---|---|
| 560643 | 9/1957 | Belgium | 369/263 |
| 51-103402 | 8/1976 | Japan . | |
| 53-12306 | 3/1978 | Japan | 369/263 |
| 60-77099 | 5/1985 | Japan . | |
| 60-98589 | 6/1985 | Japan . | |
| 1399525 | 7/1975 | United Kingdom | 369/263 |

Primary Examiner—Steven L. Stephan
Attorney, Agent, or Firm—Hill, Van Santen, Steadman & Simpson

[57] ABSTRACT

In an optical disk player according to this invention, a movable chassis mounted with an optical pickup, a turntable and the like is supported by springs joined with respective positions of a frame, and in this optical disk player, dampers are inserted between the frame and the movable chassis to absorb the energy of vibrations of the movable chassis. At the same time, a correcting means such as a coiled spring is so arranged as to be capable of changing the biasing force for biasing the movable chassis in a neutral condition with respect to the frame by adjustment operation. With the above arrangement, the slope of Q-value of the resonance region becomes moderate enough at the leading edge of the slope, and thus the vibration isolation characteristic is improved, so that sound omissions tend not to occur. The degradation of the vibration isolation characteristic of the damper that usually occurs on tilt of the chassis is effectively prevented. At the same time, a collision between the frame and the movable chassis can be prevented without increasing the movable range of the movable chassis with respect to the frame.

7 Claims, 16 Drawing Figures

OPTICAL DISK PLAYER

TECHNICAL FIELD

The present invention relates to an optical disk player having an improved vibration isolation characteristic and suitable for use in a moving object, such as an automobile, an aircraft or the like.

BACKGROUND ART

In the conventional cassette tape player for cars using magnetic tapes, no vibration isolation mechanism has been substantially provided although the performance of the player falls due to wow and flutter caused by the vibration of the car, because the degradation of the performance is not reagarded as very serious problem.

However, when an optical disk player for scanning and reproducing high-density signals recorded on a disk by the use of an optical pickup is mounted in the moving object, such as the automobile, the aircraft or the like, sound omissions tend to occur due to vibrations of the moving object. Therefore, the principal part of the player is placed on a player frame through rubber cushions so as to be insulated from the vibration. But quality factor Q of the resonance region of the vibration generated in the principal part of the player tends to be inevitably large, so that it is often difficult to have the player operated normally. In addition, the frequency band of the vibrations caused under various severe conditions with which the car is met, normally includes the above resonance region.

Therefore, if the optical disk player for cars is isolated from the vibrations only by rubber cushions, sound omissions occur, and it becomes difficult to enable the optical disk player to be normally operated.

Hence, the following mechanism is proposed as the vibration isolation mechanism of the optical disk player for cars instead of rubber cushions. In the mechanism, a movable chassis (on which an optical pick-up, a turntable and the like are mounted) is suspended by suspension coiled springs in several positions of a frame such as a stationary chassis or a cabinet, and dampers which prevent the movable chassis from vibrating are inserted between the frame and the movable chassis so that the movable chassis can be floated with respect to the frame. Thus, resonance frequency $f_0$ in the lateral (horizontal) direction of the vibration system is decreased. Hence, by adoption of the above vibration isolation mechanisum, the slope of Q-value of the resonance region becomes moderate enough at the leading edge of the slope in comparison with the case in which the rubber cushion is adopted, so that the noted sound omission does not occur, and the vibration isolation characteristic is greatly improved.

However, if the optical disk player having the vibration isolation mechanism as described above is mounted on the car, the following further trouble arises.

When the frame is mounted in the player mounting position of the car at a given angle with the horizontal plane of the car, the direction of the gravity acting on the movable chassis changes, so that the movable chassis tends to be displaced from a neutral equilibrium position with respect to the frame.

The movable chassis is displaced from the neutral equilibrium position with respect to the frame until the dampers are elastically deformed to re-establish an equilibrium state. Thereby, the vibration isolation characteristic of the damper is degraded. In addition, as the movable chassis deviates from the neutral equilibrium position with respect to the frame, the distance between the movable chassis and the frame in the displacement direction of the movable chassis is decreased, so that the movable range in the displacement direction of the movable chassis is decreased with respect to the frame.

DISCLOSURE OF INVENTION

In order to solve the above problems, there is disclosed an optical disk player of the present invention, in which a movable chassis is mounted with an optical pickup, a turntable and the like, and so supported by coiled springs joined with a frame in several positions as to be floated with, respect to the player. The optical disk player frame further comprises dampers inserted between the frame and the movable chassis to absorb the energy of vibrations of the movable chassis, and biasing means for correction capable of varying a biasing force to enable the movable chassis to be biased with respect to the frame by adjustment operation, and also inserted between the frame and the movable chassis, whereby the positional deviation of the movable chassis due to the setting angle of the frame from a neutral equilibrium position with respect to the frame is corrected by changing the biasing force by adjustment operation, and the movable chassis is kept in the neutral equilibrium position regardless of the setting angle.

With the above arrangement, the increase in Q-value of the resonance region can be prevented, so that the vibration isolation characteristics are improved and sound omissions tend not to occur. The degradation of the vibration isolation characteristic of the damper can be effectively prevented, and at the same time, a collision between the frame and the movable chassis can be prevented without increasing the movable range of the movable chassis with respect to the frame.

BEST MODE OF CARRYING OUT THE INVENTION

Figure 1:
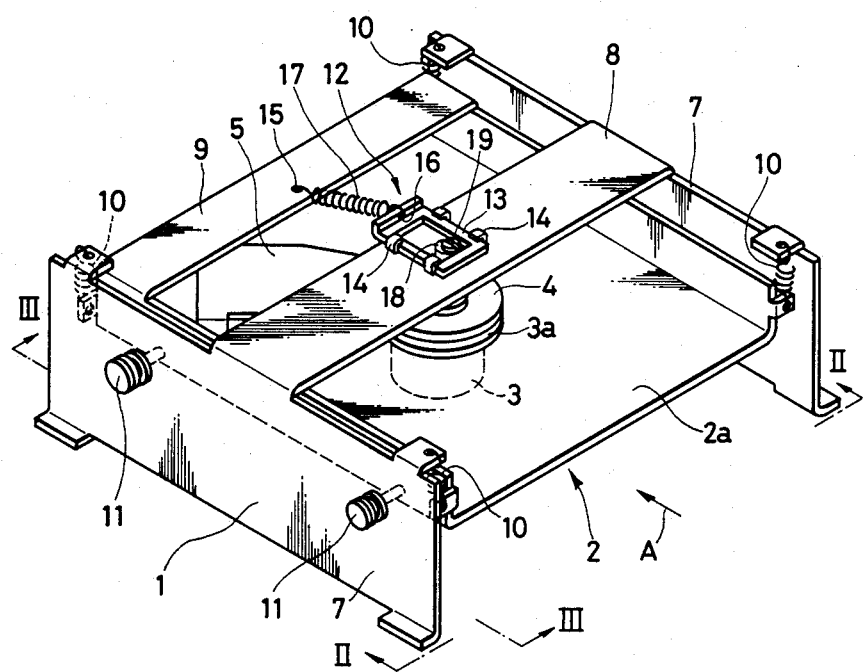
FIG. 1 is a schematic perspective view showing a chassis and a frame in an embodiment of an optical disk player for cars to which the present invention is applied.

An embodiment in which the present invention is applied to an optical disk player for cars will be described with reference to the accompanying drawings. FIGS. 1 to 11 show the embodiment and firstly, a state of a principal part 2 of the player mounted on a frame 1, that is, a stationary chassis will be described with reference to FIGS. 1 to 3.

The principal part 2 of the player comprises a movable chassis 2a, an optical pickup 6 which is movable along a guide groove (not shown) formed in the movable chassis 2a, and a turntable 3a on which an optical disk (not shown) as a recording medium is to be placed. On the movable chassis 2a, there are also mounted a motor 3 and the like. The disk (not shown) is turned by the turntable 3a driven by the motor 3. The disk inserted in the direction of arrow A in FIG. 1 is chucked by a disk chuck 4 rotatably mounted on the free end of a chucking arm 5 which is vertically swingable.

The frame 1 accommodated in a cabinet 30 (see FIG. 4) and mounted in a player mounting position (not shown) of the car comprises a pair of side plates 7 and a connecting member 8 which connects the side plates 7 with each other. The movable chassis 2a is suspended from the frame 1 through four suspension coiled springs 10. Four dampers 11 are inserted between the movable chassis 2a and the side plates 7 of the frame 1 near the respective suspension coiled springs 10 so as to absorb the energy of vibrations of the principal part 2 of the player. Therefore, the principal part 2 of the player is kept in a floating state with respect to the frame 1.

Figure 10:
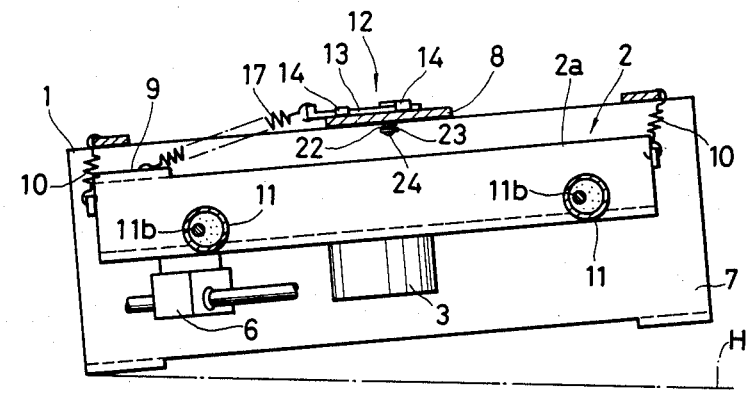
FIG. 10 is a view similar to FIG. 3, showing a state wherein the optical disk player is mounted in a player mounting position of a car at a given angle with the horizontal plane of the car under a condition that the coiled spring for correction is not adjusted.
Figure 11:
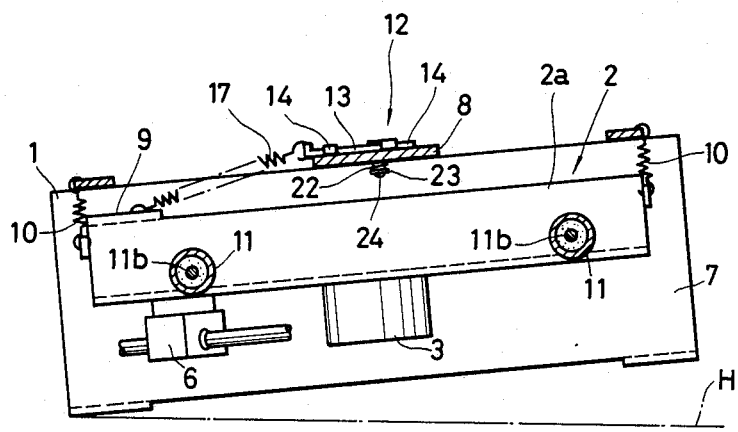
FIG. 11 is a view similar to FIG. 10, showing a state wherein the optical disk player is mounted in the player mounting position after the coiled spring for correction is adjusted.

A mounting state correction mechanism 12 is disposed between the connecting member 8 of the frame 1 and an upper plate 9 of the movable chassis 2a so as to change an equilibrium position of the principal part 2 of the player with respect to the frame 1 when the frame 1 is so secured as to have a given angle with the horizontal plane H of the car (see FIGS. 10 and 11). The mounting state correction mechanism 12 will be described later with reference to FIGS. 7 and 8.

Figure 4:
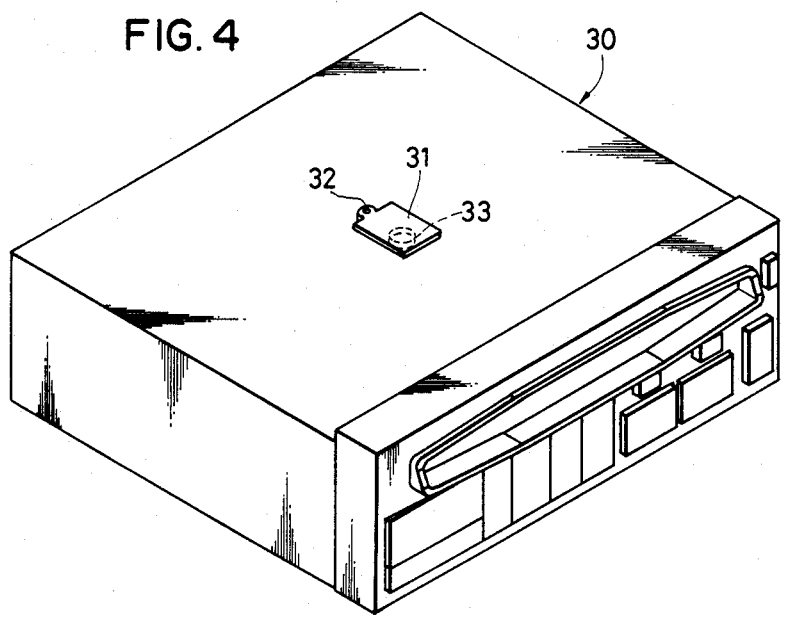
FIG. 4 is a perspective view showing the overall arrangement of the optical disk player in FIG. 1.

Accommodated in the cabinet 30 shown in FIG. 4 is the frame 1 to which the principal part 2 of the player and the like are secured as shown in FIG. 1. When a lid 31 is swung on a screw 32, with which the lid 31 is attached to the upper wall of the cabinet 30, an adjustment-operation opening 33 formed in the upper wall of the cabinet 30 is opened or closed, so that an eccentric cam 18 of the mounting state correction mechanism 12 can be turned with a screw-driver (not shown) inserted through the opening 33.

Figure 5:
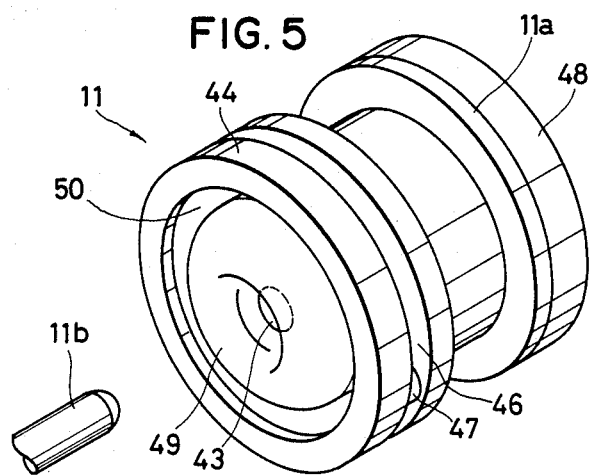
FIG. 5 is a perspective view of a damper in FIG. 1 in an enlarged and exploded state.

The constitution and function of the damper 11 will be described with reference to FIGS. 5 to 6D.

The damper 11 comprises a vessel 11a mounted on the side plate 7 of the frame 1, and a rod 11b fixedly fitted in a mounting hole 45 of the movable chassis 2a.

The vessel 11a is made of an elastic material such as rubber and defines a space 40 in which a viscous fluid is sealed. A movable member 41 is so disposed as to project into the substantially central portion of the space 40. The movable member 41 is of a quadrangular prism, on the outer periphery of which projections 42 are disposed so as to increase viscous drag of the movable member 41 in the viscous fluid, and into a hole 43 forming the inner periphery of which the rod 11b is press-fitted. The space 40 is defined by four walls which are in opposed relation to the outer periphery of the movable member 41, so that the space 40 has a substantially square cross-secton. The rod 11b may comprise a rod body with a cylindrical body of rubber mounted on the rod body.

The vessel 11a has a lid 48 at the outer side thereof and a stopper 44 of a thick ring-like flange at the inner side thereof. Between the movable member 41 and the stopper 44, there is disposed a film-like connecting member 49 which protrudes more than the stopper 44 like a donut. Between the stopper 44 and the connecting member 49, there is an anuular groove 50 of a substantially triangular shape in section, the width of which gradually decreases towards its bottom. A groove 46 is formed in the outer periphery of the stopper 44 and is engaged with the rim of a hole 28 formed in the side plate 7 of the frame 1. A pair of projections 47 formed in the groove 46 are engaged with recesses (not shown) formed in the rim of the hole 28 in order to determine the setting angle of the vessel 11a in the side plate 7.

In this embodiment, silicone oil (12,000 cS) fills the space 40 formed in the body of the vessel 11a made of butyl rubber, and then the lid 48 of butyl rubber is attached to the vessel body so as to enclose the oil. The vessel 11a is mounted in the side plate 7 of the frame 1 in such a way that the pair of projections 47 of the vessel 11a are aligned with each other along the horizontal line.

Figure 6A:
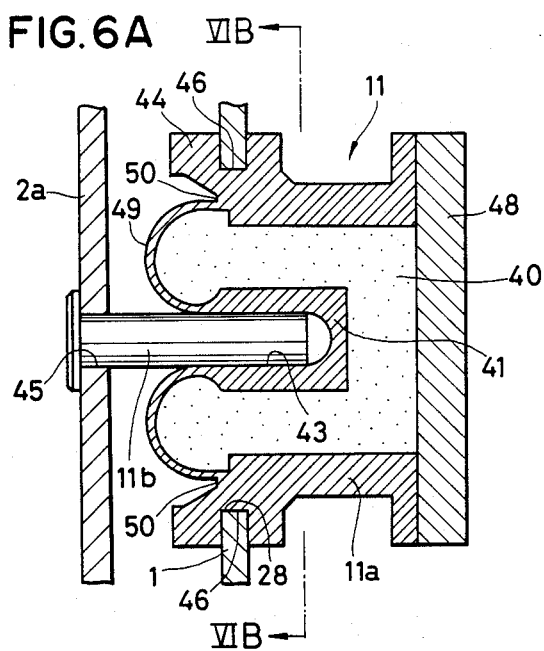
FIG. 6A is a longitudinal sectional view of the damper in FIG. 1 in the neutral equilibrium state.
Figure 6B:
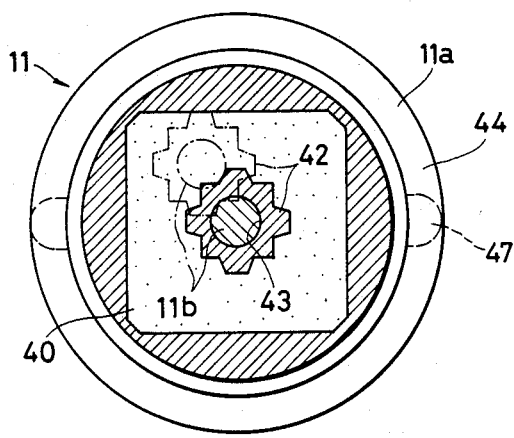
FIG. 6B is a sectional view of the damper taken along the line VIB—VIB in FIG. 6A.
Figure 6C:
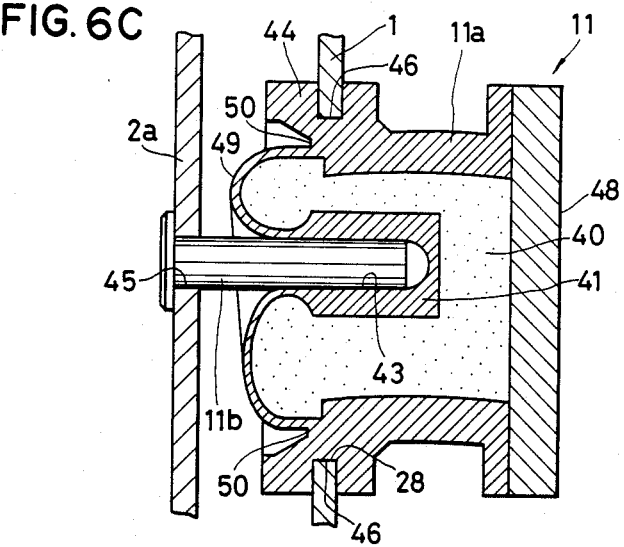
FIG. 6C is a longitudinal sectional view similar to FIG. 6A and showing a state wherein the damper is displaced from the neutral equilibrium position in the direction perpendicular to an axis thereof.

If the frame 1 is vertically moved, for example, moved downward with respect to the movable chassis 2a, the vessel 11a is also moved downward, that is, in a direction perpendicular to the axial direction thereof as shown in FIG. 6C, and the rod 11b fixedly fitted in the mounting hole 45 of the movable chassis 2a is also to be moved downward together with the vessel 11a, but due to elastic deformation of the connecting member 49 made of the film, the rod 11b with the movable member 41 is relatively moved in the space 40 in three dimensional direction. In other words, the rod 11b is not substantially moved and as shown in FIG. 6C, the vessel 11a is so deformed as to move downward only the outer portion of the vessel 11a, such as the stopper 44 and the like. Therefore, the viscous drag is generated between the silicone oil and the movable member 41 since the silicone oil in the vessel 11a is moved from the lower position to the upper position of the movable member 41, so that the movable chassis 2a is prevented from assuming the vibration of the frame 1, because the energy of the vibration is absorbed by the viscous drag.

When the frame 1 vibrates in the back-and-forth direction (in the right-and-left direction in FIG. 3) with respect to the movable chassis 2a, the vessel 11a is deformed in a similar way as indicated in FIG. 6C. The Vibration from the frame 1 to the movable chassis 2a is sufficiently attenuated as the vertical vibration is.

Figure 2:
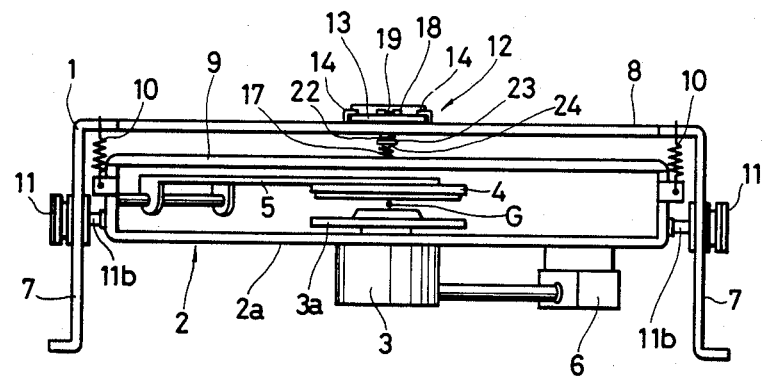
FIG. 2 is a front view of the chassis and frame in FIG. 1 taken along the line II—II thereof.
Figure 6D:
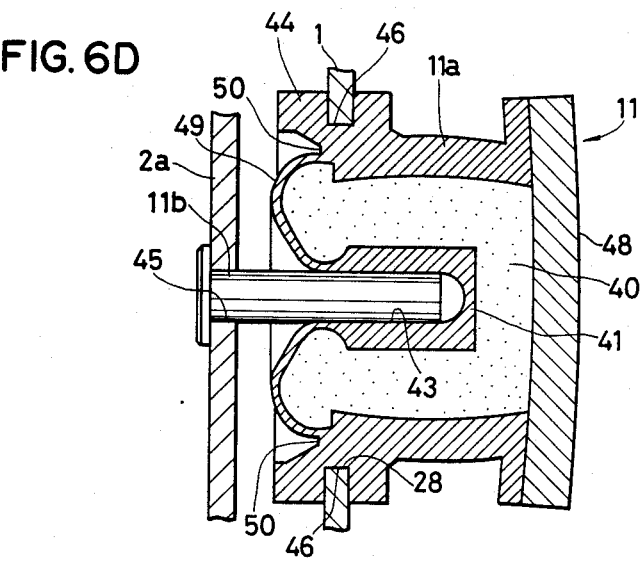
FIG. 6D is a longitudinal sectional view similar to FIG. 6A and showing a state wherein the damper is displaced from the neutral equilibrium position in the axial direction thereof.

If the frame 1 vibrates in the right-and-left direction in FIG. 2 with respect to the movable chassis 2a, the vessel 11a is so moved as to approach the movable chassis 2a as indicated in FIG. 6D, so that the vibration from the frame 1 to the movable chassis 2a is sufficiently attenuated due to the deformation of the vessel 11a shown in FIG. 6D, and the same may be said of the vessel 11a moved away from the movable chassis 2a.

The stopper 44 and lid 48 of the vessel 11a function as stoppers and impact absorbers when the vessel 11a is overrun in the axial direction of the damper 11 due to the vibration of the frame 1. That is, when the stopper 44 of the vessel 11a comes closer to the movable chassis 2a from the state shown in FIG. 6D, the movable chassis 2a is elastically brought into contact with the side surface of the stopper 44. At the same time, the flat distal end of the movable member 41 is elastically brought into contact with the inner side of the lid 48. Therefore, the impact energy can be absorbed and further movement of the frame 7 toward the movable chassis 2a can be prevented.

The projections 42 of the movable member 41 function as stoppers and impact absorbers when the frame 1 vibrates in the vertical or back-and-forth direction thereof with respect to the movable chassis 2a. That is, as indicated in chain-dotted lines in FIG. 6B, when the movable member 41 vibrates and relatively comes close to the upper wall of the space 40, the upper projection 42 is elastically brought into contact with the upper wall. As a result, the impact energy can be absorbed, and further displacement of the rod 11b relative to the vessel 11a can be prevented.

Differing from the conventional damper whose vessel has two spaces, the vessel 11a of the damper 11 comprises only one space 40 as mentioned above, and the vibration energy is dissipated due to the movement of the movable member 41 against the viscous fluid in the space 40. As the projection 42 protrudes from each of the four outer surfaces of the movable member 41 of the quadrangular prism, the surface of the movable member 41 is uneven, so that the energy dissipation due to the movement of the movable member 41 becomes larger, because the surface area of the movable member 41 immersed in the viscous fluid is effectively increased. Furthermore, since the vessel 11a is made of the butyl rubber, the vessel 11a deforms repeatedly as the frame 1 vibrates with respect to the movable chassis 2a, so that the vibration energy is dissipated in the butyl rubber. Therefore, the vessel 11a, in other words, the damper 11, has a large energy absorbing capacity although it is rather small.

Figure 7:
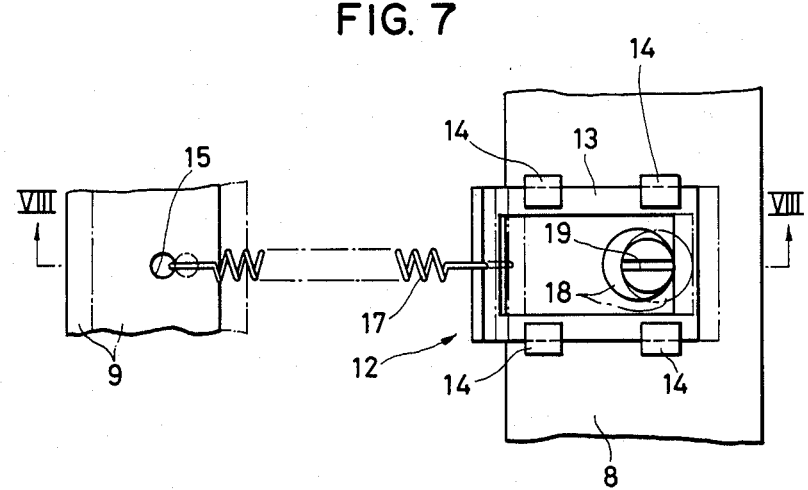
FIG. 7 is an enlarged plan view of a mounting state correction mechanism shown in FIG. 1.
Figure 8:
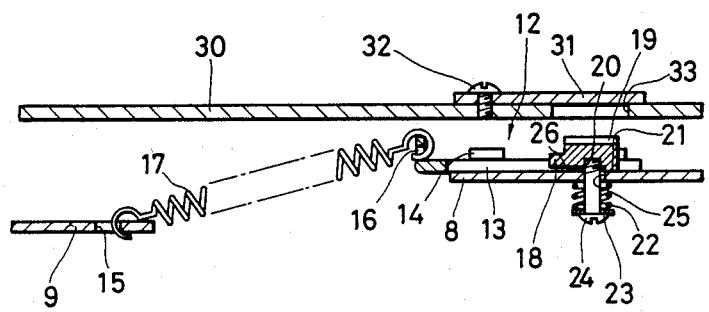
FIG. 8 is a sectional view of the mounting state correction mechanism taken along the line VIII—VIII in FIG. 7.
Figure 9:
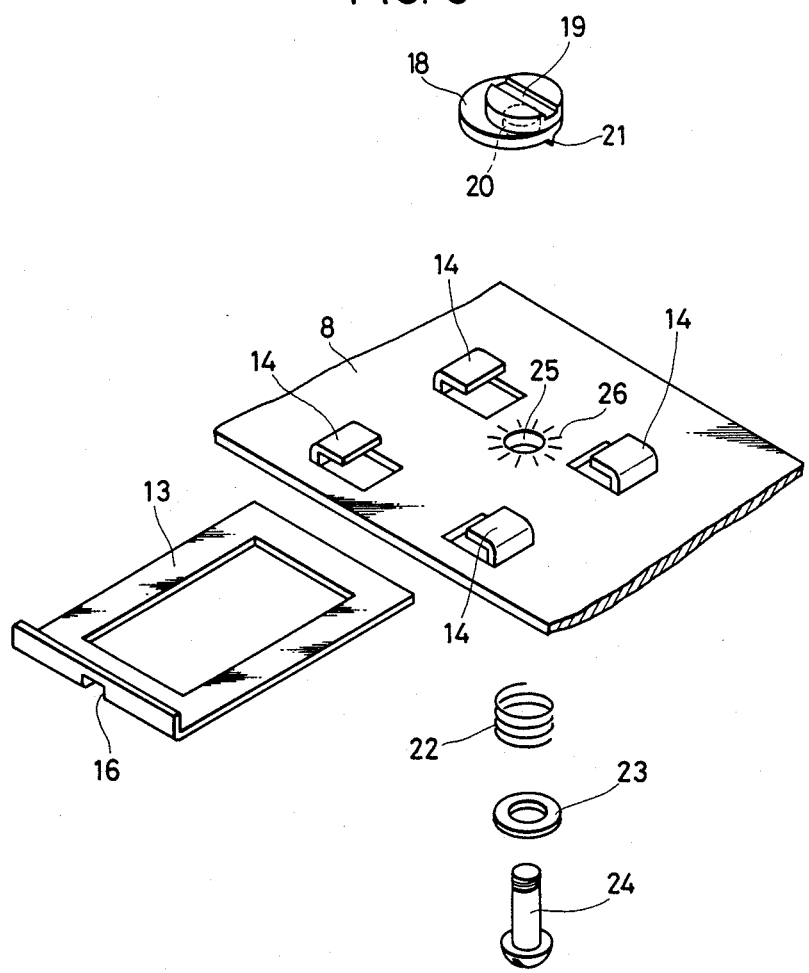
FIG. 9 is an exploded perspective view of the mounting state correction mechanism shown in FIG. 7.

As shown in FIGS. 7 to 9, the mounting state correction mechanism 12 comprises a rectangular frame 13, two pairs of guide hooks 14 formed on the connecting member 8 of the frame 1 in order to have the rectangular frame 13 slid along the guide hooks 14, an eccentric cam 18 for causing the rectangular frame 13 to be slid along the guide hooks 14, and a coiled spring 17 which joins engaging holes 16 and 15, respectively formed in the rectangular frame 13 and the upper plate 9 of the movable chassis 2a. The coiled spring 17 can give a biasing force a predetermined magnitude to the movable chassis 2a so as to correct a positional deviation of the movable chassis 2a from the neutral equilibrium position with respect to the frame 1 when the frame 1 is mounted at a given angle with the horizontal plane. However, the coiled spring 17 has such a low spring constant as it scarcely gives any influence to the vibration system which comprises the frame 1, the principal part 2 of the player, the suspension coiled springs 10 and the dampers 11, (whose frequency $f_0$ in the lateral (horizontal) direction is generally low).

The mounting state correction mechanism 12 is so arranged between the frame 1 and the movable chassis 2a as to have its central line, by which the mechanism 12 is symmetrically bisected in right and left portions, substantially included in the perpendicular plane including the center of gravity G of the principal part 2 of the player. The direction of the biasing force of the coiled spring 17 acting on the movable chassis 2a is always within the perpendicular plane, and the positional deviation of the movable chassis 2a from the neutral equilibrium position with respect to the frame 1 is substantially kept in parallel with the perpendicular plane. In this embodiment, the coiled spring 17 is arranged at an angle of about 10° with the bottom surface of the movable chassis 2a, which is the reference surface of the principal part 2 of the player, when the principal part 2 of the player is held in the neutral equilibrium position.

Formed in the head of the eccentric cam 18 is a notch which is to be engaged with the screwdriver. A screw hole 20 is formed in the bottom of the eccentric cam 18. A locking projection 21 is formed near the outer edge of the bottom surface. As is apparent from FIG. 9, the eccentric cam 18 is secured with a screw 24, on which a washer 23 and a biasing spring 22 are mounted. Thus, the eccentric cam 18 is pressed against the connecting member 8 with the biasing spring 22, so that the locking projection 21 of the eccentric cam 18 is selectively engaged with one of a plurality of radial grooves formed around a hole 25 formed in the frame 1. Therefore, the eccentric cam 18 is held at a desired adjusted angular position.

The function of the mounting state correction mechanism 12 at the time when the frame 1 is mounted in the player mounting position of the car in parallel with, or at a given angle with the horizontal plane H of the car, will be described with reference to FIGS. 3, 10, and 11.

Figure 3:
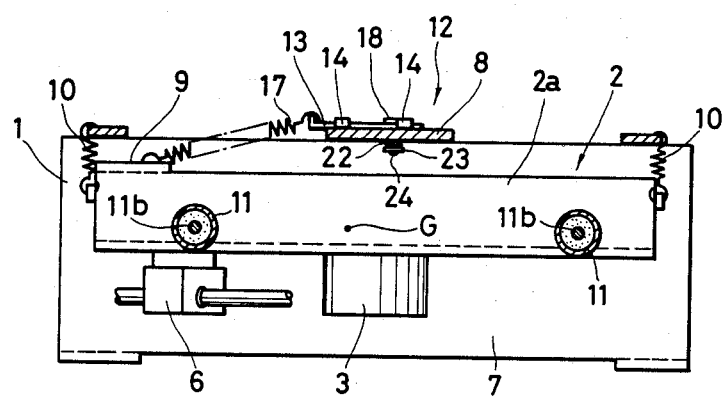
FIG. 3 is a sectional view of the player in FIG. 1 taken along the line III—III thereof.

When the frame 1 is mounted in the player mounting position of the car in parallel with the horizontal plane H of the car, the principal part 2 of the player is held by the suspension coiled springs 10 and the correcting coiled spring 17 and the dampers 11 is in the neutral equilibrium position as shown in FIG. 3. Therefore, no force is transmitted from the movable chassis 2a to the dampers 11.

If the frame 1 is mounted in the player mounting position at a given angle with the horizontal plane H of the car with adjusting the coiled spring 17 of the mounting state correction mechanism 12, the direction of gravity of the principal part 2 of the player acting on the bottom surface of the movable chassis 2a changes, so that the force from the movable chassis 2a is transmitted to the dampers 11 and then, the dampers 11 deform as shown in FIG. 10. Thus, the movable chassis 2a deviates from the neutral equilibrium position with respect to the frame 1.

Therefore, if the eccentric cam 18 is turned with the screwdriver (not shown) inserted through the adjustment operation opening 33 so as to operate the mounting state correction mechanism 12 shown in FIG. 7, the eccentric cam 18 and the rectangular frame 13 are moved from the position inicated in the solid lines to the position indicated in chain-dotted lines in FIG. 7, and thereby, the biasing force of the coiled spring 17 increases and the movable chassis 2a is moved from the position indicated in solid lines to the position indicated in chain-dotted lines in FIG. 7. Therefore, by means of properly adjusting the angular displacement of the eccentric cam 18 of the mounting state corection mechanism 12, it is easy to return the movable chassis 2a from the position shown in FIG. 10 to the neutral equilibrium position shown in FIG. 11.

Figure 12:
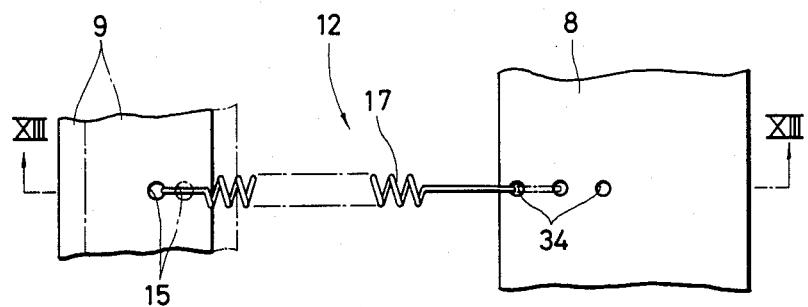
FIG. 12 is a view similar to FIG. 7, showing another embodiment of the mounting state correction mechanism.
Figure 13:
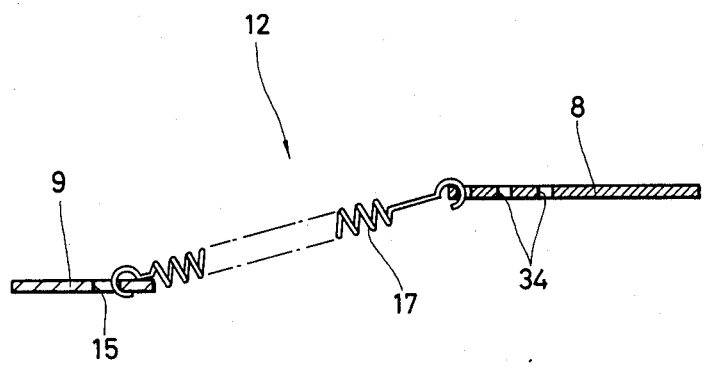
FIG. 13 is a sectional view of the mounting state correction mechanism in FIG. 12 taken along the line XIII—XIII thereof.

FIGS. 12 and 13 show another embodiment of the mounting state correction mechanism 12 shown in FIG. 1. In this embodiment, one end of the coiled spring 17 is hooked in one of a plurality of engaging holes 34 formed in a line in the connecting member 8 of the frame 1. By selectively hooking one end of the coiled spring 17 in one of the engaging holes 34, the biasing force of the coiled spring 17 can be changed like the mechanism illustrated in FIGS. 7 and 8.

If the arrangements shown in FIGS. 12 and 7 are compared, it is apparent that the mounting state correction mechanism 12 shown in FIGS. 12 and 13 is not only simpler in construction than the one shown in FIGS. 1 to 11, but also has the coiled spring 17 the capable of being changed larger than that of the mechanism 12 shown in FIGS. 1 to 11. Therefore, the mounting state correction mechanism 12 shown in FIGS. 12 and 13 is more suitable for the optical disk player for cars which is mounted in the player mounting position sometimes in parallel with and sometimes at a given angle with the horizontal plane of the car.

The present invention is exemplified by the above embodiments. However, various changes and modifications may be made without departing from the spirit and scope of the invention. For example, in the embodiment shown in FIGS. 12 and 13, the end of the coiled spring 17 may be engaged with the intermediate one of three or more engaging holes 34 arranged in a line at the time when the frame 1 is mounted at a given angle with the horizontal plane and the biasing force of the coiled spring 17 properly acts on the movable chassis 2a so as to hold the movable chassis 2a in the neutral equilibrium position. Thus, if the frame 1 is mounted in the player mounting position at an angle which is in a reverse relation with the angle shown in FIG. 10, and the movable chassis 2a is displaced from the neutral equilibrium position not in the direction shown in FIG. 10 but in the reverse direction, the adjustment can be performed by means of having the one end of the coiled spring 17 engaged the engaging hole 34 not far from, as shown in FIG. 12, but near to the upper plate 9 of the movable chassis 2a. With this adjustment, the biasing force of the coiled spring 17 is decreased, so that the movable chassis 2a is moved from the position indicated in chain-dotted lines to the position indicated in solid lines in FIG. 12 with respect to the frame 1. Therefore, the positional deviation of the movable chassis 2a from the neutral equilibrium position with respect to the frame 1, which is in the reverse relation with the displacement shown in FIG. 10, can be corrected. And it is apparent that the operation reverse to that mentioned above will be enough to correct the position of the movable chassis 2a when the frame 1 is inclined further to the same side as that shown in FIG. 10. In other words, the correcting operation can be performed with only one mounting state correction mechanism 12, even if the frame 1 is mounted in the player mounting position sometimes at the normal angle with and sometimes at the reverse angle with the horizontal plane of the car.

Industrial Applicability

According to the present invention, a movable chassis mounted with an optical pickup, a turntable and the like is supported with a plurality of coiled springs which are joined with the respective positions of a frame, and at the same time, connected with the frame by a plurality of dampers so as to absorb the energy of vibrations of the movable chassis. Therefore, the slope of Q-value of the resonance region becomes small at the leading edge of the slope as compared with the conventional optical disk player only supported with rubber cushions, and the vibration isolation characteristic is improved, so that sound omissions tend not to occur.

Furthermore, even if the optical disk player is mounted at any angle with the horizontal plane of the car, the principal part of the player, (that is, the movable chassis mounted with an optical pickup, a turntable and the like) can be always kept in the neutral equilibrium position, so that degradation of the vibration isolation characteristic of the dampers can be effectively prevented, and in addition, the collision between the frame and the movable chassis can be prevented without increasing the movable range of the movable chassis with respect to the frame.

We claim:

1. An optical disk player in which a movable chassis member mounted with an optical pickup, a turntable and the like, is supported by a plurality of springs connected to respective positions on a frame member to hold the movable chassis in a floating state with respect to the frame, comprising at least one damper inserted between said frame member and said movable chassis member so as to absorb the energy of vibrations of said movable chassis, each said damper comprising a generally horizontal rod fixed to one of said members and a resilient vessel of viscous liquid secured to the other of said members with said rod secured centrally of said vessel, and correcting means between said member and said movable chassis member to adjust a resilient biasing force for biasing said movable chassis with respect to said frame by adjustment operation, wherein a positional deviation of said movable chassis causing movement of said rod away from centered condition in said vessel is corrected by adjusting the biasing force, so that said movable chassis is kept with said rod in centered condition in neutral equilibrium position regardless of the setting angle of said frame.

2. The optical disk player according to claim 1, characterized in that said movable chassis is suspended from said frame by said springs, and four substantially spaced dampers are provided.

3. The optical disk player according to claim 1, characterized in that said frame comprises a pair of side plates and a connecting member by which said pair of side plates are connected with each other, said connecting member being provided with adjusting means for changing the biasing force at an angle to the horizontal.

4. The optical disk player according to claim 3, characterized in that said correcting means is a coiled spring secured between said frame and said connecting member.

5. The optical disk player according to claim 1, characterized in that said adjusting means is an eccentric cam.

6. The optical disk player according to claim 1, characterized in that said frame is accommodated in a cabinet, in the upper wall of which an opening for adjustment operation is formed in order to operate said adjusting means.

7. The optical disk player according to claim 1, characterized in that said vessel comprises an elastic material, enclosing a viscous fluid in a space defined within said vessel, and said rod being coupled to said vessel, said vessel being provided with a prism-like portion projected into said space and secured to said rod for movement therewith and for resisting movement of said rod relative to said vessel to thereby increase energy absorption upon relative movement of said rod and said vessel.

* * * * *